United States Patent [19]

Yamamoto et al.

[11] Patent Number: 4,523,618
[45] Date of Patent: Jun. 18, 1985

[54] BRANCHED POLYMER, PROCESS FOR THE PREPARATION THEREOF, TIRE TREAD RUBBER COMPOSITION AND TIRE

[75] Inventors: Keisaku Yamamoto; Nobuyuki Yoshida; Yasushi Okamoto; Akio Imai; Tomoaki Seki, all of Ichihara; Hiroshi Furukawa, Ashiya; Yuichi Saito, Nishinomiya, all of Japan

[73] Assignees: Sumitomo Chemical Company, Ltd., Osaka; Sumitomo Rubber Industries, Ltd., Kobe, both of Japan

[21] Appl. No.: 480,348

[22] Filed: Mar. 30, 1983

[30] Foreign Application Priority Data

Mar. 30, 1982 [JP] Japan .................................. 57-53387

[51] Int. Cl.$^3$ ............................................. B60C 11/00
[52] U.S. Cl. ............................... 152/209 R; 152/450; 525/194; 525/332.9
[58] Field of Search ....................... 152/330 R, 209 R; 525/194, 332.9

[56] References Cited

U.S. PATENT DOCUMENTS

| | | | |
|---|---|---|---|
| 4,039,633 | 8/1977 | Zelinski | 525/338 |
| 4,105,714 | 8/1978 | Trepka et al. | 525/339 |
| 4,334,567 | 6/1982 | Bond | 152/209 |

FOREIGN PATENT DOCUMENTS 2071117  2/1981  United Kingdom .

*Primary Examiner*—Bernard Lipman
*Attorney, Agent, or Firm*—Armstrong, Nikaido, Marmelstein & Kubovcik

[57] ABSTRACT

A branched polymer which is a butadiene homopolymer or a copolymer of an aromatic vinyl compound and butadiene and has a glass transition temperature of not less than −50° C. and of which at least 70% by weight of the polymer chains has a branched structure in which high molecules are coupled by a trifunctional or tetrafunctional coupling agent, has an excellent roll processability as required in mixing a rubber component with additives and provides a rubber component for tire tread showing a low rolling resistance and an excellent wet skid resistance characteristic.

8 Claims, 3 Drawing Figures

BRANCHED POLYMER, PROCESS FOR THE PREPARATION THEREOF, TIRE TREAD RUBBER COMPOSITION AND TIRE

BACKGROUND OF THE INVENTION

The present invention relates to a branched polymer and a process for the preparation thereof, and more particularly to a polymer having a high wet skid resistance, an excellent rolling resistance characteristic and a good processability, a process for the preparation thereof, a rubber composition for tire tread containing the polymer and a tire made from the composition.

In recent years, a demand of saving fuel cost for automobiles is increasing more and more. Especially, characteristics of tires have an important influence upon saving fuel cost, and the improvement thereof has been strongly desired.

The characteristics required for tires are mainly abrasion resistance, wet skid resistance, low heat generation, bending resistance, chipping resistance, groove cracking resistance, and the like. It is necessary that tires have various characteristics in good balance. In particular, it is important from the viewpoint of resources saving and energy saving that energy loss is small.

Among these characteristics, a high wet skid resistance required for steering stability and a low rolling resistance required for fuel saving are particularly important characteristics. In a conventional knowledge, it is recognized that these both characteristics conflict with each other.

Hitherto, natural rubber, polyisoprene rubber, high cis-1,4-polybutadiene rubber and styrene-butadiene rubber have been mainly employed as a rubber for tires, particularly as a rubber for tread. Natural rubber, polyisoprene rubber and high-cis-polybutadiene rubber have the feature that the energy loss is a little, thus the rolling resistance is low, but have the drawback that the wet skid resistance against a wet road is low. On the other hand, styrene-butadiene rubber has a high wet skid resistance, but is not sufficient as a material of energy saving tires because the heat generation characteristic is high and the energy loss is large, thus the rolling resistance is high.

In order to remedy the drawbacks of these polymers, a polymer blending technique has hitherto been developed. For instance, a blend of styrene-butadiene rubber and a high-cis-polybutadiene is mainly used in tires for small passenger cars. However, with respect to maintaining a high wet skid resistance and a low rolling resistance, this blend is apart from the level demanded in recent years.

In recent years, a composition containing a diene rubber having unsaturated pendant groups attracts attention, and for instance, it is disclosed in British Pat. No. 1,261,371 and Japanese Unexamined Patent Publication Nos. 62248/1979 and 12133/1980 that such a composition provides tires having improved both wet skid resistance and rolling resistance characteristics.

The rolling resistance of tires is caused by energy loss attended on repeated deformation of a tire at the time of travelling of cars. That is to say, the tire causes compressive deformation, bending deformatin and shearing deformation by load, and at the time of travelling, these deformations continuously move along the circumference of the tire. At that time, the dynamic energy loss occurs during repetition of various deformations and restoration in each portion of the tire. In other words, rubber-like materials, including tires, are the so-called viscoelastomers, and the stress-strain relation is not linear and the strain against the stress shows a following time lag. Owing to such a viscoelasticity of tires, the deformation at the time of touching the ground and restoration at the time of untouching are repeated during travelling, and at that time, the phase difference is caused between the stress and the strain. As a result, hysteresis loss, namely energy loss, is caused. The improvement of the rolling resistance is no more than reduction of such an energy loss. It is known that such an energy is largely affected by a tread rubber compound in addition to structures of carcass and breaker of a tire and a side wall rubber compound. Thus, for reducing the rolling resistance of a tire from the viewpoint of a tread rubber compound, it is necessary to reduce the energy loss owing to compressive deformation, bending deformation and shearing deformation. Considering from the dynamic viscoelasticity of a rubber, this means reduction of loss compliance $[E''/(E^*)^2]$ and loss modulus $(E'')$.

On the other hand, the wet grip characteristic is considered to be a frictional resistance which generates against the stress that tires receive from a road upon gliding on uneven road. That is to say, a viscoelastomer such as a tire shows deformation and restoration with a time lag against the receiving stress, and as a result, a torque in the reverse direction to the travelling direction is generated. The resistance due to this torque is a frictional resistance, and it depends on the loss tangent $(\tan \delta = E''/E')$ of the dynamic viscoelasticity (Nippon Gomu Kyokaishi, 48, No. 11, 1970). Therefore, though both the wet grip characteristic and rolling resistance characteristic depend on the dynamic loss characteristics $[E'', E''/(E^*)^2$ and $E''/E']$, the wet grip characteristic is raised by increase of these values in contrast with the rolling resistance characteristic. In a word, the dynamic loss characteristic values are desirable to be large for the wet grip characteristic and desirable to be small for the rolling resistance characteristic. Therefore, it has been recognized that these both characteristics conflict with each other, and it has been considered that no satisfactory rubber composition cannot be obtained from the same raw material.

SUMMARY OF THE INVENTION

The present inventors paid their attention to the fact that the regions of the deformation rate that the material receives are different between the wet grip characteristic and the rolling resistance characteristic. That is to say, whereas the rolling resistance characteristic is a deformation rate corresponding to the rotating speed of a tire and the frequency is within the region of ten to twenty Hz at a usual travelling speed, the wet grip characteristic is a stimulus that a tire receives upon sliding on an uneven road and the frequency is in a very high region. Thus, the both characteristics are different in the deformation frequency region to which the dynamic loss characteristics contribute. Therefore, it would be possible to improve the conflicting both characteristics together by lowering the loss characteristics at the low frequency region contributing to the rolling resistance characteristic as much as possible and raising the loss characteristics at the high frequency region contributing to the wet grip characteristic as high as possible. From such a point of view, the present inventors made a study about the molecular structure and molecular distribution of polymers and have found the following things.

(a) The wet grip characteristic called in question in a high frequency region is correlative to the glass transition point (Tg) of a diene rubber, and the higher the glass transition point (Tg), the higher the wet grip characteristic. Hereupon, the glass transition point corresponds to the movement of the relatively short segment in a polymer chain, and the microstructure of a polymer has a very important influence thereupon.

(b) The rolling resistance characteristic called in question in a low frequency region has relation to the molecular weight or molecular distribution of a diene rubber, and the higher the molecular weight, or the narrower the molecular distribution, the more the rolling resistance characteristic is improved. This is based on that the dynamic loss of a rubber composition much depends on the molecular weight or molecular distribution rather than the microstructure of a polymer, and the more the polymer has long molecular chains, the more the value of the dynamic loss is decreased.

From the above-mentioned, it would be understood that for possessing both a high wet grip characteristic and an excellent rolling resistance characteristic, it is necessary to select a diene rubber having a high molecular weight or a narrow molecular distribution and moreover having a high glass transition point. However, a diene rubber satisfying such a condition has in general the marked disadvantage with respect to processability, for instance, badness of band formation at the time of roll working, lack of flowability at the time of extrusion processing and high heat generation at the time of milling. It is an industrially very important subject to eliminate these disadvantages in a tire manufacturing process. The present inventors have now found that the following polymer has a high wet grip characteristic and an excellent rolling resistance characteristic and moreover has excellent processabilities required in manufacturing tires such as milling processability, roll processability and extrusion processability.

In accordance with the present invention, there is provided a branched polymer which is a butadiene homopolymer or a copolymer of butadiene and an aromatic vinyl compound and has a glass transition temperature of not less than $-50°$ C. and of which at least 70% by weight of the polymer chains has a branched structure in which high molecules are coupled by a trifunctional or tetrafunctional coupling agent.

DETAILED DESCRIPTION

Figure 1:
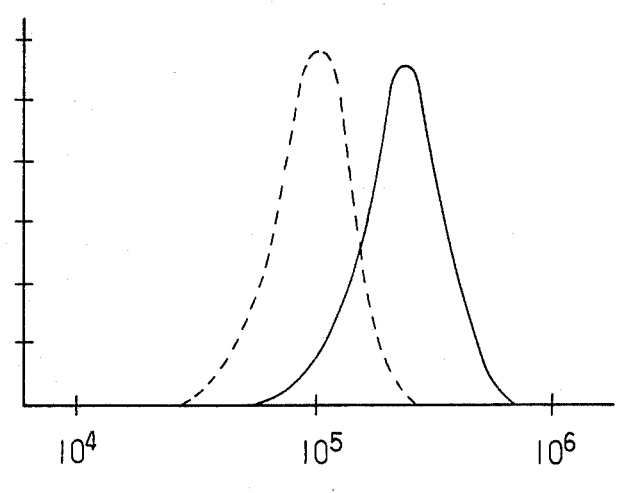
FIGS. 1 to 3 are graphs showing a molecular distribution of a polymer measured by gel permeation chromatography, in which the dotted line shows the molecular distribution of a polymer obtained just before coupling by a coupling agent and the solid line shows the molecular distribution of a polymer obtained 30 minutes after the addition of a coupling agent, and in which the abscissa shows the weight average molecular weight and the ordinate shows the relative concentration.

It is necessary that the glass transition temperature of the branched polymer is at least $-50°$ C. When the glass transition temperature is lower than $-50°$ C., the wet grip characteristic of a tire is lowered, thus the braking characteristic becomes worse.

Also, it is necessary for obtaining a polymer having an excellent processability that the proportion of the polymer chains coupled by a trifunctional or tetrafunctional coupling agent in the polymer chains of the branched polymer of the invention is at least 70% by weight. The term "polymer chains coupled by a trifunctional or tetrafunctional coupling agent" as used herein means polymer chains having such a structure that high molecular branches coupled by chemical bonding radiate in the three or four directions from a centralized coupling agent atom or atomic group.

In the branched polymer of the present invention, at least 70% by weight of the polymer chains thereof is polymer chains having coupled branches as explained above, and the residue is polymer chains having no branch.

The weight proportion of the polymer chains having coupled branches in the polymer can be determined from the molecular distribution measured by gel permeation chromatography. That is to say, the weight proportion of each of the polymer chains having coupled branches and the polymer chains having no branch is defined by the relative ratio of the height of a peak corresponding to the average molecular weight of the polymer chains having coupled branches and the height of a peak corresponding to the average molecular weight of the polymer chains having no branch.

Although in the branched polymer of the present invention, the coupled polymer chains have the structure in which high molecules are coupled by a trifunctional coupling agent, a tetrafunctional coupling agent or a mixture thereof, it is desirable that the high molecules are coupled by a tetrafunctional coupling agent, because the processability is particularly good and the controllability of the polymerization reaction for producing the branched polymer of the invention is good.

The higher the proportion of the coupled polymer chains (in other words, the polymer chains having a branched or radial structure), the better the processability. The proportion of the coupled polymer chains in the branched polymer of the invention is at least 70% by weight, preferably at least 80% by weight. When the proportion of the coupled polymer chains is at least 70% by weight, the stability in winding of a rubber sheet on a roll at the time of roll processing is good and the processing procedure is easy. Further, when the proportion is not less than 80% by weight, a good sheet having a smooth surface is obtained. Such a polymer containing the coupled polymer chains in a high proportion has a small so-called cold flowability, and can be stored in a stacked state.

The aromatic vinyl compounds used in the present invention include, for instance, styrene, styrene derivatives having a substituent on the benzene ring such as m-methylstyrene, p-methylstyrene and p-t-butylstyrene, styrene derivatives having a substituent on the vinyl group such as α-methylstyrene, and the like. In particular, p-methylstyrene is preferably employed because of being easily obtainable upon practicing on an industrial scale.

With respect to the copolymer of an aromatic vinyl compound and butadiene, the arrangement of the aromatic vinyl compound and butadiene in a polymer chain is not particularly limited, but it is desirable from the viewpoint of the dynamic heat generation that the length of the homopolymer segment of the aromatic vinyl compound is shortened to the extent such that the glass transition point based on the homopolymer segment is not observed, that is to say, it is desirable that the arrangement of the aromatic vinyl compound and butadiene in the polymer chain is random.

It is desirable that the branched polymer of the present invention has a molecular weight such that the intrinsic viscosity of the polymer measured in toluene at 30° C. falls within the range of 1.0 to 6.0 dl./g. When the intrinsic viscosity is less than 1.0, the dynamic loss becomes large and the rolling resistance characteristic becomes worse. On the other hand, when the intrinsic viscosity is more than 6.0, the processing procedure in a usual processing machine becomes difficult. For instance, quantitative extruding property at the time of extrusion processing becomes worse.

Further, it is desirable that the content of the cross-linked polymer included in the branched polymer of the invention is not more than 1.0% by weight. The term "cross-linked polymer" as used herein means a polymer portion which is insoluble in toluene at 30° C. When the content of the cross-linked polymer is more than 1.0% by weight, the roll processability or the extrusion processability becomes worse, and furthermore, tensile strength and tear strength of moldings or cured products are remarkably lowered.

In accordance with the present invention, there is also provided a process for preparing a branched polymer which comprises polymerizing butadiene or a mixture of butadiene and an aromatic vinyl compound in a hydrocarbon solvent in the presence of an organolithium compound as a polymerization initiator and a Lewis base as a modifier selected from the group consisting of an ether compound and an amine compound, adding 0.175 to 0.333 mole of a coupling agent per mole of the active end of the resulting polymer and reacting the polymer with the coupling agent.

The hydrocarbon solvents used in the process of the present invention include, for instance, aromatic hydrocarbons such as benzene, toluene, xylene and ethylbenzene, aliphatic hydrocarbons such as hexane and heptane, and alicyclic hydrocarbons such as cyclopentane, cyclohexane and methylcyclohexane. These hydrocarbons may be employed alone or in admixture thereof. Particularly, aliphatic hydrocarbons and alicyclic hydrocarbons are preferably employed as solvents.

The organolithium compounds used as polymerization initiators in the process of the invention are those known as one end or both end initiation type anionic polymerization initiators. Typical examples of the organolithium compounds are, for instance, ethyllithium, propyllithium, butyllithium, amyllithium, trimethylenedilithium, tetramethylenedilithium, hexyllithium, cyclohexyllithium, phenyllithium, tolyllithium, naphthyllithium, lithium complexes of condensed or noncondensed aromatic rings, and compounds such as oligobutadienyldilithium and oligoisoprenyldilithium which are in the living state.

The polymerization initiated by such an organolithium compound proceeds by a living anionic polymerization mechanism as well known, and is very convenient for providing the branched polymer of the present invention.

In the process of the present invention, a Lewis basic compound selected from an ether compound and a tertiary amine compound is employed as a modifier for controlling the glass trasition temperature of the produced polymer.

Examples of the ether compound are cyclic ethers such as tetrahydrofuran, tetrahydropyran and 1,4-dioxane, aliphatic monoethers such as diethyl ether and dibutyl ether, aliphatic polyethers such as ethylene glycol dimethyl ether, ethylene glycol dibutyl ether, diethylene glycol dimethyl ether, diethylene glycol diethyl ether and diethylene glycol dibutyl ether, and aromatic ethers such as diphenyl ether and anisole.

Examples of the tertiary amine compound are triethylamine, tripropylamine, tributylamine, N,N,N',N'-tetramethylethylenediamine, N,N-dimethylaniline, pyridine and quinoline.

The larger the amount of the Lewis basic compound used as a modifier, the higher the glass transition temperature of the produced polymer becomes. Although the amount of these Lewis basic compounds to be used for obtaining a polymer having a prescribed glass transition temperature varies depending on the kind thereof and also it is affected by the polymerization condition, in general the higher the polymerization temperature and the lower the content of an aromatic vinyl compound in the polymer, a larger amount of the Lewis basic compound is required.

The Lewis basic compounds used in the process of the invention for obtaining a polymer having a glass transition temperature of not less than $-50°$ C. are also effective as an agent for giving random arrangement in copolymerization of butadiene and an aromatic vinyl compound.

In the process of the present invention, a compound having 3 or 4 halogen atoms and a dicarboxylic acid diester can be employed as a coupling agent which is added to a solution of an active polymer.

Examples of the compound having 3 or 4 halogen atoms used as a coupling agent are inorganic salts and their derivatives such as trichloromethylsilane, silicon tetrachloride, tin tetrachloride and titanium tetrachloride, and organic halogen compounds such as tetrabromobenzene and trichlorobenzene. One or more kinds of silicon tetrachloride, tin tetrachloride and trichloromethylsilane are preferably employed in points of controllability of the proportion of the coupled polymer chains. Either one of silicon tetrachloride and tin tetrachloride is more preferred in points of processability of the obtained branched polymer.

Examples of the dicarboxylic acid diesters used as a coupling agent are, for instance, dimethyl adipate, diethyl adipate, dioctyl adipate, diethyl fumarate, dimethyl maleate, diethyl maleate, di-n-butyl maleate, dioctyl maleate, and the like.

The coupling agent is employed in an amount of 0.175 to 0.333 mole per mole of the active polymer end. Particularly, the tetrafunctional coupling agent is employed in an amount of 0.175 to 0.250 mole per mole of the active polymer end, and the trifunctional coupling agent is employed in an amount of 0.233 to 0.333 mole per mole of the active polymer end, whereby the proportion of the coupled polymer chains can be easily controlled within the range of not less than 70% by weight. When the amount of the coupling agent is less than 0.175 mole per mole of the active polymer end, the roll processability of the obtained polymer becomes worse and phenomena such as sheet breaking occur. On the other hand, when the amount of the coupling agent is more than 0.333 mole, the processability becomes worse. For instance, biting into rolls is bad and a good sheet is not obtained. Also, the content of the cross-linked polymer included in the branched polymer increases, and consequently the extrusion processability becomes worse or the tensile strength of the cured product is lowered.

The branched polymer of the present invention is very useful for providing a rubber composition for tire tread.

In accordance with the present invention, there is provided a rubber composition comprising a polymer as a rubber component and rubber additives, said polymer being a butadiene homopolymer or a styrene-butadiene copolymer prepared by a solution polymerization method and having a glass transition temperature of not less than $-50°$ C., and at least 70% by weight of the polymer chains of said polymer having a branched structure in which high molecules are coupled by a trifunctional or tetrafunctional coupling agent.

Although it is a matter of course that the butadiene polymer or styrene-butadiene polymer as defined above can be employed alone as a rubber component of the tread rubber composition, it can also be employed with other rubbers such as natural rubber, synthetic isoprene rubber and a emulsion polymerized styrene-butadiene rubber. It is particularly preferable from points of total balance of rolling resistance, wet grip characteristic and processability to employ natural rubber, synthetic isoprene or a mixture thereof in an amount of not more than 30 parts by weight based on 100 parts by weight of the whole rubber components. When the amount is more than 30 parts by weight, the wet grip characteristic is lowered.

Usual additives may be employed in the tire tread rubber composition of the present invention, e.g. carbon black, process oil, wax, antioxidant, curing agent and curing accelerator.

The thus prepared rubber composition is employed in tread of various tires, for instance, tires for passenger car, light truck, large truck, bus and motor cycle, thus providing tires having excellent rolling resistance characteristic and wet grip characteristic.

The present invention is more specifically described and explained by means of the following Examples in which all % and parts are by weight unless otherwise noted. It is to be understood that the present invention is not limited to the Examples, and various changes and modifications may be made in the invention without departing from the spirit and scope thereof.

In the following Examples, physical properties were measured under the following conditions.

Intrinsic viscosity $[\eta]$:

The measurement was made at 30° C. in toluene solvent by employing an Ostwald's viscometer.

Glass transition temperature:

The measurement was made by raising the temperature at a rate of 20° C./minute employing a differential scanning calorimeter made by E. I. du Pont de Nemours & Co. The transition temperature was determined from the position of the transition heat absorption peak.

Molecular distribution:

A high pressure liquid chromatograph HLC-802UR made by Toyo Soda Manufacturing Co., Ltd. was used, and columns of $10^3$, $10^4$, $10^6$ and $10^7$ were selected as distribution columns. A refractometer was used as a detector. The measurement was made at 40° C. by using tetrahydrofuran as a developing solvent. The proportion of the coupled polymer chains having branches was calculated from the ratio of the height of the peak corresponding to the average molecular weight of the coupled polymer chains having branches to the height of the peak corresponding to the average molecular weight of the polymer chains having no branch.

Wet skid resistance characteristic:

The wet skid resistance was measured by employing a portable skid resistance tester made by Stanley with respect to a cured rubber sheet having a thickness of 6.5 mm. An asphalt surface sprayed with water of 20° C. was employed as a contact road surface.

Dynamic loss value:

The measurement was made by varying the temperature of a cured rubber sheet at 0.6% in initial elongation, 0.1% in amplitude and 11 Hz in frequency employing a dynamic solid viscoelastometer made by Toyo Baldwin Co., Ltd.

Roll processability:

The temperature of 6 inch rolls was adjusted to 50° C., and the nip was adjusted to 0.7, 1.0, 1.5 or 2.0 mm. A polymer was wound round the roll, and the state of the polymer was observed and estimated according to the following criteria.

| Grade | State of polymer on roll |
|---|---|
| 5: | Winding state is very good, sheet skin is smooth and sheet has a stickiness. |
| 4: | Winding state is good, but sheet edge breaking occurs or biting into rolls in an early stage is somewhat late. |
| 3: | Rubber sheet wound on the roll is lacking in stickiness or biting into rolls of bank is somewhat bad. |
| 2: | Bagging and sheet breaking occur. |
| 1: | Biting into rolls in an early stage is bad, and the polymer is not formed into a sheet and does not wind round the roll. |

EXAMPLE 1

After replacing air in a 12 liter autoclave equipped with a stirrer and a jacket with nitrogen gas, the autoclave was charged with 7 liters of purified dry n-hexane, 33 g. of tetrahydrofuran and 10 millimoles of n-butyllithium dissolved in hexane. The inner temperature was elevated to 50° C., and 550 g. of butadiene and 250 g. of styrene were added to the autoclave to start the polymerization. After 25 minutes from starting of the polymerization, 120 g. of butadiene was added to the autoclave, and further, 80 g. of butadiene was added to the autoclave after 25 minutes. After the completion of the addition of 1,000 g. of the monomers in total, the reaction was further continued for 60 minutes. After the completion of the polymerization for 110 minutes in total, 2.5 millimoles of silicon tetrachloride dissolved in hexane (0.25 mole of silicon tetrachloride per mole of the active polymer) was added to the autoclave, and the reaction was carried out at 50° C. for 30 minutes.

To the reaction mixture was added 20 ml. of methanol to terminate the polymerization, and after admixing with 20 g. of 2,6-di-tert-butyl-4-methylphenol, the reaction mixture was poured into hot water and n-hexane was distilled away. The precipitated polymer was dried under reduced pressure. Physical properties of the obtained polymer were measured.

The results are shown in Table 1.

The formulation for obtaining a cured rubber was as followed.

| Ingredient | Amount (part) |
|---|---|
| Polymer | 100 |
| Carbon black | 60 |
| Aromatic oil | 20 |
| Zinc oxide | 5 |

-continued

| Ingredient | Amount (part) |
| --- | --- |
| Stearic acid | 2 |
| Curing accelerator | 2 |
| Sulfur | 1.6 |

Also, the result of the measurement of molecular distribution is shown in FIG. 1. In FIG. 1, the abscissa indicates the weight average molecular weight and the ordinate indicates the relative concentration. The proportion of the polymer chains having a branched structure in which branches were coupled by the tetrafunctional coupling agent, was calculated as 97% by weight from the ratio of the heights in the molecular weight corresponding to the main peaks of the curves before and after the addition of the coupling agent.

As seen in Table 1, the polymer of Example 1 according to the process of the present invention is very excellent in roll processing property and the sheet has a smooth skin and a stickiness. Also, seeing the dynamic loss values, for instance, the $E''/E'$ value is low, i.e. 0.108, and this means that the rolling resistance when applied to a tire is low. Further, the wet skid resistance is high, i.e. 60, and this means that the braking characteristic on a wet road is excellent.

Like this, the polymer of the present invention has a high wet skid resistance, an excellent rolling resistance and a good processability.

EXAMPLES 2 TO 4 AND COMPARATIVE EXAMPLES 1 TO 4

The procedures of Example 1 were repeated except that the kinds and amounts of the raw materials were changed. Examples 2 to 4 show experiments based on the process of the present invention, and Comparative Examples 1 to 4 show experiments not based on the process of the present invention.

Physical properties of the obtained polymers are shown in Table 1.

Figure 2:
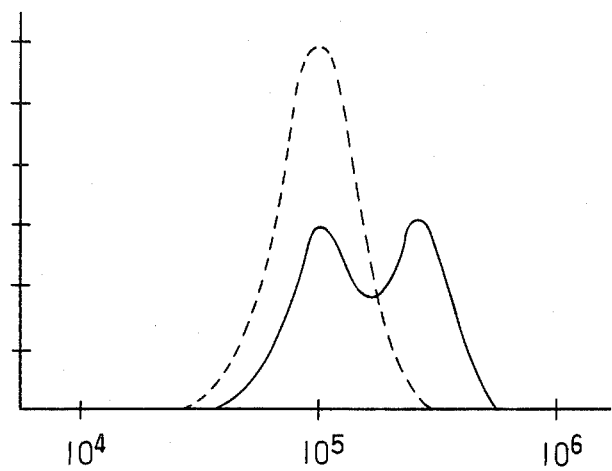

Also, the result of the measurement of molecular distribution of the polymer of Comparative Example 1 is shown in FIG. 2.

As is clear from Table 1, the polymers of Examples 2 to 4 prepared according to the process of the present invention provide cured products having a good wet skid resistance characteristic and a small dynamic loss, and moreover have a very good roll processing property.

In contrast to this, the polymers of Comparative Examples 1 to 4 are poor in characteristics. For instance, the polymers of Comparative Examples 1 and 2 of which the proportion of the coupled polymer chains is less than 70%, are poor in roll processability. Also, the polymer of Comparative Example 3 which has a glass transition temperature below −50° C., has a low wet skid resistance, and the polymer of Comparative Example 4 prepared by using a difunctional coupling agent is inferior in roll processability.

TABLE 1

|  | Ex. 1 | Ex. 2 | Ex. 3 | Ex. 4 | Com. Ex. 1 | Com. Ex. 2 | Com. Ex. 3 | Com. Ex. 4 |
| --- | --- | --- | --- | --- | --- | --- | --- | --- |
| Polymerization |  |  |  |  |  |  |  |  |
| Styrene (g.) | 250 | 0 | 100 | 150 | 250 | 250 | 250 | 250 |
| Butadiene (g.) | 750 | 1000 | 900 | 850 | 750 | 750 | 750 | 750 |
| Tetrahydrofuran (g.) | 33 | 300 | 100 | 50 | 33 | 33 | 0 | 33 |
| Butyllithium (millimole) | 10 | 10 | 8 | 8 | 10 | 6 | 10 | 10 |
| Coupling agent* (millimole) | SiCl$_4$ 2.5 (0.25) | SnCl$_4$ 2.2 (0.22) | MTCS 2.6 (0.33) | SiCl$_4$ 1.7 (0.21) | SiCl$_4$ 1.3 (0.13) | 0 (0) | SiCl$_4$ 2.5 (0.25) | DDSC 2.5 (0.25) |
| Physical property of polymer |  |  |  |  |  |  |  |  |
| Proportion of coupled polymer chains (%) | 97 | 86 | 96 | 82 | 52 | 0 | 96 | 48 |
| Intrinsic viscosity (dl./g) | 2.02 | 1.92 | 2.32 | 2.25 | 1.68 | 1.95 | 1.98 | 1.68 |
| Glass transition temperature (°C.) | −44.2 | −30.7 | −37.5 | −40.3 | −44.6 | −43.9 | −72.3 | −45.0 |
| Physical property of cured product |  |  |  |  |  |  |  |  |
| Wet skid resistance | 60 | 65 | 62 | 61 | 60 | 60 | 50 | 60 |
| Dynamic loss values (60° C.) |  |  |  |  |  |  |  |  |
| $E''$ (kg./cm.$^2$) | 15.1 | 31.6 | 14.3 | 30.2 | 28.6 | 32.8 | 17.8 | 25.2 |
| $[E''/(E^*)^2] \times 10^3$ (kg./cm.$^2$)$^{-1}$ | 0.76 | 0.46 | 0.56 | 0.46 | 0.71 | 0.27 | 0.79 | 0.65 |
| $E''/E'$ (—) | 0.108 | 0.110 | 0.101 | 0.106 | 0.123 | 0.105 | 0.112 | 0.118 |
| Roll processability |  |  |  |  |  |  |  |  |
| nip 0.7 mm | 5 | 4 | 4 | 5 | 3 | 2 | 5 | 2 |
| 1.0 mm | 5 | 5 | 5 | 5 | 4 | 2 | 5 | 2 |
| 1.5 mm | 5 | 5 | 5 | 5 | 3 | 2 | 5 | 2 |
| 2.0 mm | 5 | 5 | 5 | 5 | 2 | 1 | 5 | 2 |

(Note)
*Coupling agent: MTCS = methyltrichlorosilane, DDSC = dimethyldichlorosilane
Value in parentheses shows the number of moles per mole of active polymer.

EXAMPLES 5 TO 7

The procedures of Example 1 were repeated except that the kinds and amounts of the raw materials were changed as shown in Table 2.

The results are shown in Table 2.

Figure 3:
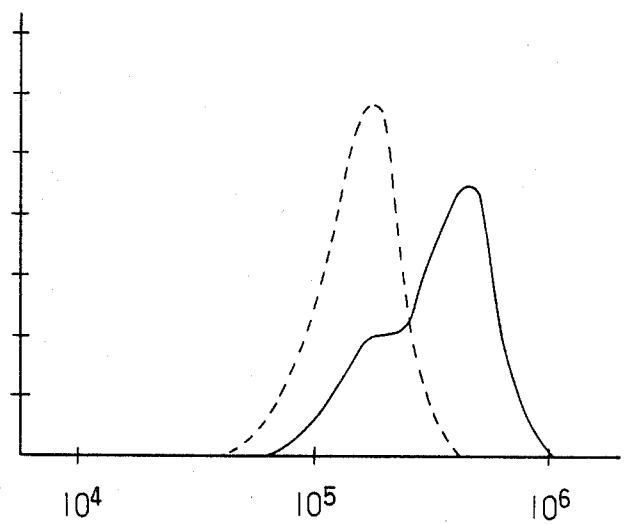

Also, the result of the measurement of molecular distribution of the polymer of Example 6 is shown in FIG. 3.

As is clear from Table 2, the polymers of Examples 5 to 7 prepared according to the process of the invention provide cured products having an improved balance of wet skid resistance characteristic and dynamic loss and moreover have a good roll processability.

COMPARATIVE EXAMPLE 5

For comparison, physical properties of a emulsion-polymerized styrene-butadiene rubber (commercially available under the commercial name "SBR #1500" made by Sumitomo Chemical Co., Ltd.) are shown in Table 2.

From comparison between Examples 1 to 7 and Comparative Example 5, it would be understood that the polymers of the present invention provide cured products having an improved balance of various physical properties and moreover have an excellent processability.

The results of the loss modulus at 65° C., the loss compliance, and the integral value from −30° C. to −15° C. of the loss coefficient are shown in Table 4.

Processability of composition:

TABLE 2

|  | Ex. 5 | Ex. 6 | Ex. 7 | Com. Ex. 5 |
|---|---|---|---|---|
| Polymerization |  |  |  |  |
| Styrene (g.) | 200 | 230 | 250 |  |
| Butadiene (g.) | 850 | 770 | 750 |  |
| Tetrahydrofuran (g.) | 40 | 40 | 40 | SBR #1500 |
| Butyllithium (millimole) | 5 | 6 | 11 |  |
| Silicon tetrachloride (millimole) | 0.9 | 1.2 | 2.7 |  |
| (the number of moles per mole of active polymer) | (0.18) | (0.20) | (0.25) |  |
| Physical property of polymer |  |  |  |  |
| Proportion of coupled polymer chains (%) | 71 | 76 | 91 | — |
| Intrinsic viscosity (dl./g.) | 3.02 | 2.51 | 1.86 | 1.86 |
| Glass transition temperature (°C.) | −43.9 | −41.5 | −39.1 | −58 |
| Physical property of cured product |  |  |  |  |
| Wet skid resistance | 60 | 60 | 61 | 58 |
| Dynamic loss values (60° C.) |  |  |  |  |
| $E''$ (kg./cm.$^2$) | 13.2 | 15.2 | 23.2 | 52.0 |
| $[E''/(E^*)^2] \times 10^3$ (kg./cm.$^2$)$^{-1}$ | 0.73 | 0.67 | 0.56 | 0.44 |
| $E''/E'$ (—) | 0.097 | 0.100 | 0.115 | 0.161 |
| Roll processability |  |  |  |  |
| nip 0.7 mm. | 4 | 4 | 5 | 5 |
| 1.0 mm. | 4 | 5 | 5 | 5 |
| 1.5 mm. | 5 | 5 | 5 | 5 |
| 2.0 mm. | 5 | 4 | 5 | 5 |

EXAMPLES 8 TO 13 AND COMPARATIVE EXAMPLES 6 TO 11

Various rubber compositions were prepared by mixing the polymer of the present invention (Examples) or a known polymer (Comparative Examples) as shown in Table 3 with additives according to the following formulation.

| Ingredient | Amount (part) |
|---|---|
| Polymer | 100 |
| Carbon black N 339 (commercial name "Showblack" made by SHOWA DENKO K.K.) | 45 |
| Wax | 2 |
| N—Isopropyl-N'—phenyl-p-phenylenediamine (antioxidant) | 2 |
| Stearic acid | 1 |
| Zinc oxide | 3 |
| Sulfur | 1.75 |
| N—Cyclohexyl-2-benzothiazyl-sulfenamide (curing accelerator) | 1 |

The viscoelasticity and processability of the rubber composition were measured as follows:

Viscoelasticity of composition:

Loss modulus $E''$ (at 65° C.), loss compliance $E''/(E^*)^2$ and loss coefficient were measured by employing a viscoelasticity spectrometer made by Kabushiki Kaisha Iwamoto Seisakusho. The loss modulus and loss compliance were measured at 10 Hz in frequency and 2% in amplitude, and the loss coefficient was measured at 10 Hz in frequency and 0.5% in amplitude.

The bagging property and sheet skin of a composition wound round an 8 inch roll were observed by the eye.

The results are shown in Table 4 together with tear strength at 170° C. of a sheet which is connected with demould splitting.

Also, steel radial tire of 165SR13 in size were prepared by using the rubber compositions in the tread portion of the tires. Occurrence of demould splitting was observed at the time of curing. The rolling resistance characteristic and wet grip characteristic of the tires were evaluated as follows:

Rolling resistance characteristic:

The rolling resistance was measured by causing the tire to run on a 60 inch drum under conditions of 80 km./hour in speed, 2.0 kg./cm.$^2$ in inner air pressure and 300 kg. in load. The rolling resistance is shown in Table 4 as an index to the result of Comparative Example 6 using a conventional emulsion-polymerized styrene-butadiene polymer as a rubber component. The smaller the rolling resistance index, the more excellent the rolling resistance characteristic.

Wet grip characteristic:

Steel radial tires of 165SR13 in size were attached to a 1500 cc. passenger car. The car was run on a slippery concrete road sprinkled with water at a speed of 60 km./hour with one passenger. The friction coefficient was calculated from the stopping distance. It is shown in Table 4 as an index to the value for Comparative Example 6. The larger the wet grip index, the better the wet grip characteristic.

The above procedures were repeated except that a blend of the polymer of the invention and natural rubber was employed as a rubber component. The results are shown in Table 5.

TABLE 3

|  | Com. Ex. 6 | Com. Ex. 7 | Com. Ex. 8 | Com. Ex. 9 | Com. Ex. 10 | Ex. 8 | Ex. 9 | Ex. 10 | Ex. 11 | Ex. 12 |
|---|---|---|---|---|---|---|---|---|---|---|
| Polymer | SBR | natural rubber | SBR | SBR | SBR | SBR | SBR | SBR | SBR | SBR |
| Polymerization | emul- | — | solu- | solu- | solu- | solu- | solu- | solu- | solu- | solu- |

TABLE 3-continued

|  | Com. Ex. 6 | Com. Ex. 7 | Com. Ex. 8 | Com. Ex. 9 | Com. Ex. 10 | Ex. 8 | Ex. 9 | Ex. 10 | Ex. 11 | Ex. 12 |
|---|---|---|---|---|---|---|---|---|---|---|
| method | sion | — | tion | tion | tion | tion | tion | tion | tion | tion |
| Microstructure |  |  |  |  |  |  |  |  |  |  |
| Styrene content (%) | 23.5 | — | 24 | 23 | 20 | 25 | 23 | 24 | 25 | 23 |
| 1,2-Bonding content in butadiene component (mol %) | 18 | — | 41 | 47 | 65 | 39 | 38 | 46 | 39 | 46 |
| Glass transition temperature (°C.) | −67.0 | — | −44.0 | −38.5 | −25.0 | −44.5 | −47.5 | −39.5 | −44.5 | −40.0 |
| Intrinsic viscosity [η] | — | — | — | 1.77 | 1.98 | 2.22 | 1.99 | 1.90 | 1.77 | 2.04 |
| Proportion of coupled polymer chains (%) | — | — | 0 | 56 | 89 | 84 | 89 | 71 | 88 | 86 |

TABLE 4

|  | Com. Ex. 6 | Com. Ex. 7 | Com. Ex. 8 | Com. Ex. 9 | Com. Ex. 10 | Ex. 8 | Ex. 9 | Ex. 10 | Ex. 11 | Ex. 12 |
|---|---|---|---|---|---|---|---|---|---|---|
| Viscoelasticity |  |  |  |  |  |  |  |  |  |  |
| Loss modulus E" at 65° C. (kg.f/cm.$^2$) | 13.6 | 10.6 | 15.2 | 13.0 | 10.5 | 12.0 | 12.2 | 12.0 | 12.6 | 11.8 |
| Loss compliance E"/(E*)$^2$ (kg.f/cm.$^2$)$^{-1}$ | 2.65 × 10$^{-3}$ | 2.41 × 10$^{-3}$ | 2.05 × 10$^{-3}$ | 1.96 × 10$^{-3}$ | 1.83 × 10$^{-3}$ | 1.63 × 10$^{-3}$ | 1.65 × 10$^{-3}$ | 1.95 × 10$^{-3}$ | 1.68 × 10$^{-3}$ | 1.82 × 10$^{-3}$ |
| Integral of loss coefficient tan δdT (T: −30° to −15 ° C.) | 4.78 | 3.23 | 6.54 | 7.02 | 7.92 | 6.39 | 7.15 | 7.76 | 6.98 | 7.63 |
| Processability |  |  |  |  |  |  |  |  |  |  |
| Bagging property | none | none | yes | none | none | none | none | none | none | none |
| Sheet skin | good | good | bad | bad | good | good | very good | very good | very good | very good |
| Tear strength at 170° C. (kg.f/cm.) | 18 | 34 | 16 | 17 | 10 | 17 | 18 | 17 | 19 | 17 |
| Demould splitting | none | none | none | none | occurrence | none | none | none | none | none |
| Rolling resistance index | 100 | 92 | 101 | 96 | 90 | 93 | 93 | 94 | 94 | 93 |
| Wet grip index | 100 | 91 | 102 | 103 | 105 | 102 | 103 | 104 | 103 | 104 |

TABLE 5

|  | Com. Ex. 11 | Ex. 13 |
|---|---|---|
| Rubber component (part) |  |  |
| Polymer of Ex. 8 | 60 | 80 |
| Natural rubber | 40 | 20 |
| Viscoelasticity |  |  |
| Loss modulus E" at 65° C. (kg.f/cm$^2$) | 10.8 | 11.9 |
| Loss compliance E"/(E*)$^2$ (kg.f/cm.$^2$)$^{-1}$ | 2.16 | 1.84 |
| Integral of loss coefficient tan δdT (T: −30° to −15° C.) | 4.39 | 6.62 |
| Processability |  |  |
| Bagging property | none | none |
| Sheet skin | good | good |
| Tear strength at 170° C. (kg.f/cm.) | 25 | 20 |
| Demould splitting | none | none |
| Rolling resistance index | 92 | 93 |
| Wet grip index | 98 | 102 |

In addition to the ingredients used in the Examples, other ingredients can be used in the Examples as set forth in the specification to obtain substantially the same results.

What we claim is:

1. A branched polymer which is a butadiene homopolymer or a copolymer of butadiene and an aromatic vinyl compound and has a glass transition temperature of not less than −50° C., an intrinsic viscosity in toluene, at 30° C., of 1.0 to 6.0 dl./g, and of which at least 70% by weight of the polymer chains has a branched structure of R$_4$Si, R$_3$Si(CH$_3$) or R$_4$Sn in which R is a polymer radical.

2. The branched polymer of claim 1, wherein the proportion of the polymer chains having a branched structure is at least 80% by weight.

3. The branched polymer of claim 1, wherein the content of a cross-linked polymer insoluble in toluene at 30° C. is at most 1.0% by weight.

4. The branched polymer of claim 1, wherein said copolymer of butadiene and an aromatic vinyl compound is a random copolymer in which the butadiene and the aromatic vinyl compound are randomly arranged.

5. The branched polymer of claim 1, wherein said aromatic vinyl compound is at least one member selected from the group consisting of styrene and p-methylstyrene.

6. A rubber composition comprising a polymer as a rubber component and rubber additives, said polymer being a butadiene homopolymer or a styrene-butadiene copolymer prepared by a solution polymerization method and having a glass transition temperature of not less than −50° C., an intrinsic viscosity of 1.0 to 6.0 dl./g. in toluene at 30° C., and at least 70% by weight of the polymer chains of said polymer having a branched structure of R$_4$Si, R$_3$Si(CH$_3$) or R$_4$Sn in which R is a polymer radical.

7. The composition of claim 6, wherein said polymer is employed in combination with 30 parts by weight of a rubber as other rubber components selected from the group consisting of natural rubber and synthetic isoprene rubber based on 100 parts by weight of the whole rubber component.

8. A tire in which a rubber composition according to claim 6 is used in tread.

* * * * *